United States Patent [19]

Skorski

[11] Patent Number: 5,724,545
[45] Date of Patent: Mar. 3, 1998

[54] MEMORY CARD WITH CAPACITY-INDEPENDENT 3-LINE ADDRESSING SYSTEM

[76] Inventor: Serge Skorski, Le Pré du Moulin, 01250 Tossiat, France

[21] Appl. No.: 211,534

[22] PCT Filed: Oct. 7, 1991

[86] PCT No.: PCT/FR91/00785
    § 371 Date: Apr. 5, 1994
    § 102(e) Date: Apr. 5, 1994

[87] PCT Pub. No.: WO93/07620
    PCT Pub. Date: Apr. 19, 1993

[30] Foreign Application Priority Data

Apr. 12, 1990 [FR] France ............... 9004980

[51] Int. Cl.$^6$ .................. G06F 12/00; G06F 9/26; G06F 9/32
[52] U.S. Cl. .................. 395/442; 395/465; 395/438; 395/405; 395/241; 395/427; 395/421.09; 395/402
[58] Field of Search ............... 395/442, 421.09, 395/427, 402, 405, 438, 241, 257, 465; 365/189.01, 185; 396/321

[56] References Cited

U.S. PATENT DOCUMENTS 5,241,662  8/1993  Maniwa et al. ............... 395/442

FOREIGN PATENT DOCUMENTS 3038985  2/1991  Japan ............... H04N 59/07

Primary Examiner—David M. Moore
Assistant Examiner—Than V. Nguyen
Attorney, Agent, or Firm—Herbert Dubno

[57] ABSTRACT

A portable electronic smart card for use as a medium for the dissemination among consumers of digitized data such as texts, pictures or game programs. The smart card is connected to user systems through a reduced set of contacts including, regardless of capacity, 3 contacts for transmitting address signals (CA1, CA2, INC/DEC), 8 contacts for transmitting data signals (D0-D7), and 5 different leading and control signals (VCC, VPP, GND, PGM, OE). For memory addressing, the card contains two up-down counter (11 and 12) which receive pulses from lines CA1, CA2 and INC/DEC.

6 Claims, 3 Drawing Sheets

MEMORY CARD WITH CAPACITY-INDEPENDENT 3-LINE ADDRESSING SYSTEM

CROSS REFERENCE TO RELATED APPLICATIONS

This application is the U.S. national phase of PCT application PCT/FR91/00785 filed 7 Oct. 1991.

FIELD OF THE INVENTION

The present invention relates generally to a memory card intended for storing information and having the size of a credit card.

BACKGROUND OF THE INVENTION

The telephone card, a so-called telecard, is known which actually has in a silicon chip a wired circuit permitting the storage of several memory registers corresponding to prepayed telephone units.

Another memory card, called a chip card, is now known which is based essentially on a microprocessor chip (CPU) which gives security or confidentiality to a limited amount of information representing either financial information (charge cards), personal information (medical records, university records), codes for access to certain locations, or even a combination of this information. Access to the information is gained by a serial connection through a single conductor through the microprocessor with the help of a complex set of instructions for transmission.

The use of microprocessor on the silicon chip takes up space and does not permit the addition of a very large memory capacity.

Figure 1:
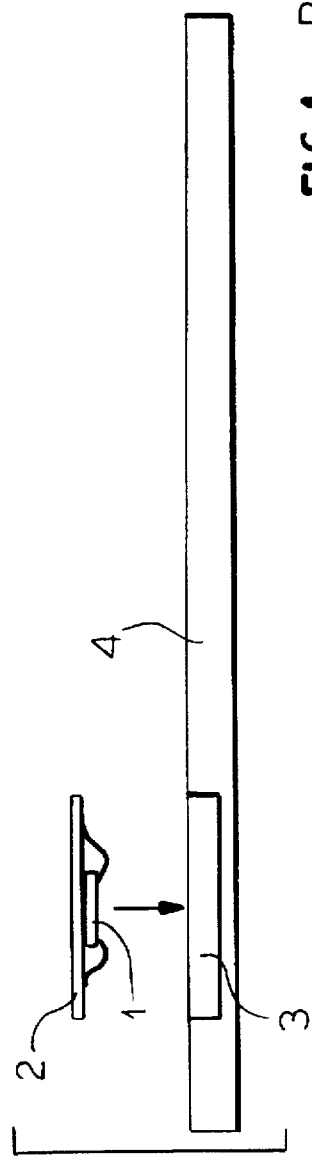
FIG. 1 is an edge view of a prior-art first type of memory card.

FIG. 1 shows the two types of cards described above. They employ for the elements that use them an array of ISO-type connectors (standard ISO 7816-2) whose number is reduced to eight. This allows the easy manufacture of these cards simply by adhering and connecting the chip 1 to the back of a small contact unit 2 made by depositing conductors on a film and then installing this unit into a seat 3 formed to this end in the 0.76 mm thick plastic of the card 4.

This embodiment is very economical and can be distributed widely.

Another known type of memory card consists of a particular treatment of one or more standard memory elements connected into a rigid printed circuit to which is also connected a connector that is then inserted into a plastic support of credit-card size. The connector has a great many address-line contacts, the number increasing with the memory of the card.

This latter type of memory card is above all used in printers as support for supplemental-characters sets or in pocket computers to replace the magnetic disks which are usually mounted in portable computers.

Figure 2:
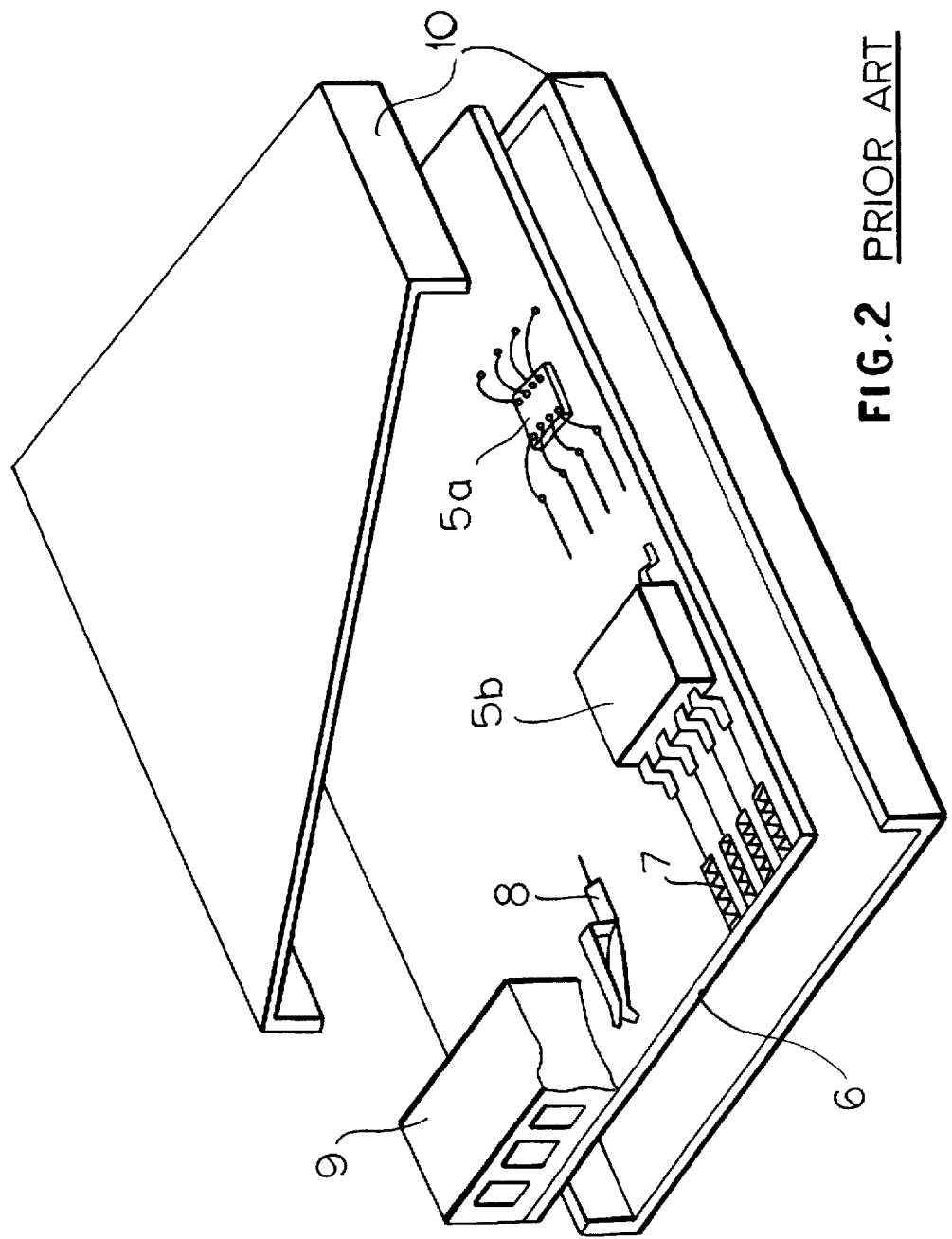
FIG. 2 is a perspective view of a prior-art second type of memory card.

FIG. 2 shows the construction of this type of card. The chips 5a forming the memory are secured as is (chip-on-board technology) or in a casing 5b and are connected to the traces of the printed circuit 6 usually formed of epoxied fiberglass. Data transmission takes place through a connector normally fitted at, the end of the printed circuit and formed either by contacts 7 formed by conductive deposits directly on the printed circuit or by a collection of mechanical connections 8 mounted beforehand in a plastic housing 9 which is mounted at the edge of the printed circuit, the contacts being soldered to the traces of the circuit.

The printed circuit is then sandwiched between two plastic housing halves 10 to form the memory card.

This technology is expensive with respect to the other system described above and does not allow this type of memory card to be distributed more widely than in the professional world.

The main reasons necessitating this embodiment are:

the need of putting together several chips of less capacity over a large surface, the large number of contacts used by large-capacity memories which takes up a significant amount of space along one edge of the card.

In fact the amount of memory provided in this type of memory card is normally from 256 kilobytes to several megabytes. This memory size requires for random addressing at least 18 address lines which requires, in addition to eight information lines and four or five selection lines for read/write, ground, and power, forming part of, at least 32 electrical-connection lines (for 256 kilobytes).

With the increase of memory capacity per chip the surface area of the required circuit will decrease to leave as the sole obstacle the high number of contacts.

OBJECT OF THE INVENTIONS

It is an object of the present invention to eliminate this last obstacle so as to make large-capacity memory cards suitable for dissemination to a large number of people thanks to their realization through the earliest technology.

SUMMARY OF THE INVENTION

To achieve the invention objects a particularity of the use of information in this type of memory card is used.

In effect these memory cards are used as mass memory and their contents is transferred when they are used into the active memory of the user system. For use in pocket computers the programmers have created programs derived from those which allow working with information on disk so that these cards are considered like this by the system of the user system.

Thus in every case the transfer of information to the active memory of the user system is done in a sequential eight-bit or word-by-word manner. The architecture proposed for the invention uses this particularity that allows one to avoid the multicontact address bus necessary for random access.

SPECIFIC DESCRIPTION

Figure 3:
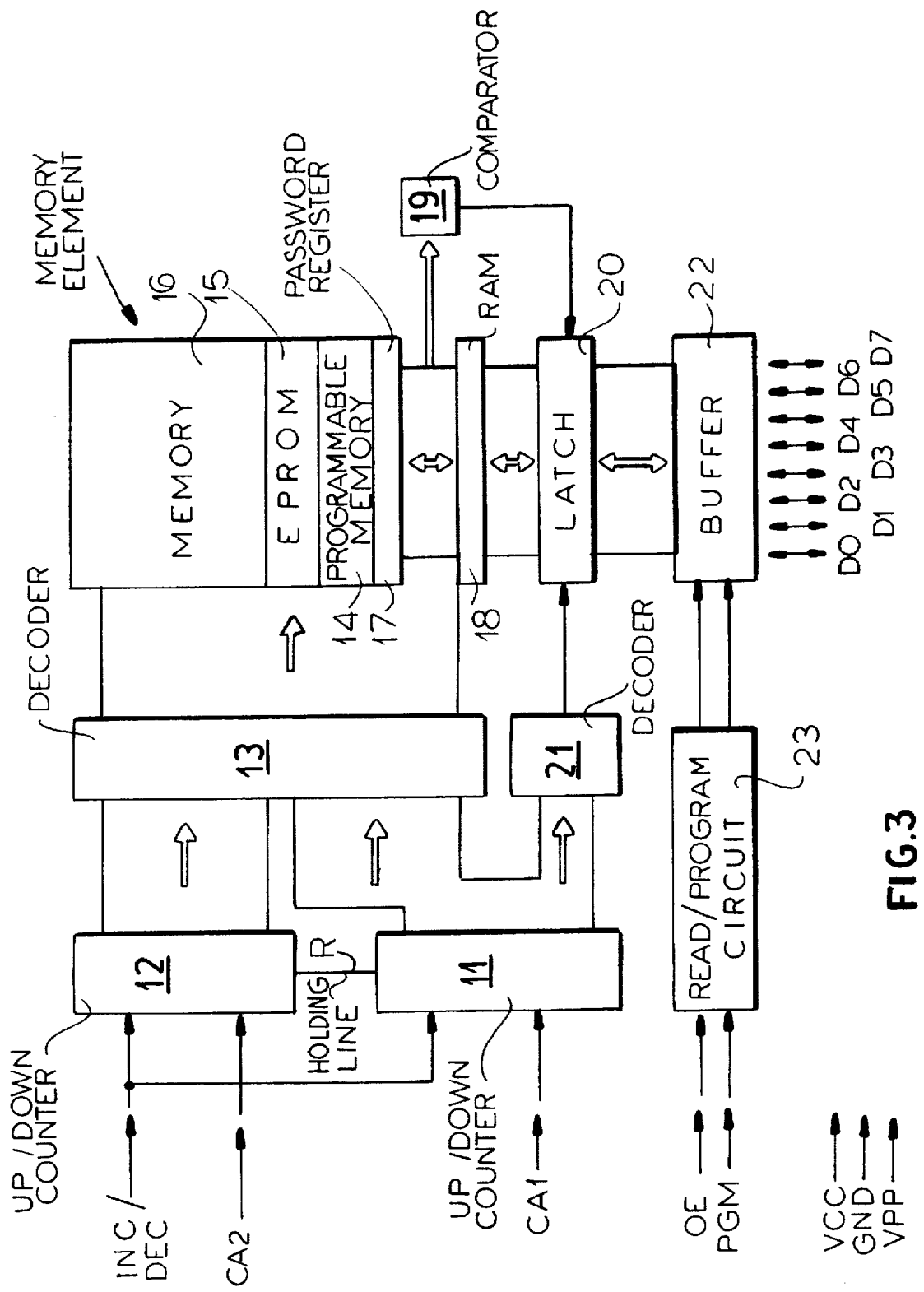
FIG. 3 is a schematic diagram illustrating the instant invention.

FIG. 3 shows the internal architecture of the invention.

The addressing system of the invention is formed by two up/down counters 11 and 12 integrated into the memory element, the former of 8 to 16 bits and the latter of 10 to 18 bits that are connected in parallel and interconnected by a holding line R and that receive pulses from the user system, each through a single line. A pulse in the 8–16 bit counter modifies the address by one. A pulse in the 10–18 bit counter modifies the address by 255 to 4096. One or the other of the counters can be incremented or decremented separately according to the logic level of a third line. The decoding of the contents of the counters by the decoder 13 allows addressing the byte sought which can be found rapidly. In effect the frequencies now used (12 Mhz) allow high transfer rates (12 Mo/s) and a movement of the address of 1 megabyte in several milliseconds.

The addressing of the bytes held in the memory card is thus done through the following three lines:

| Address counter 1 | CA1 |
| Address counter 2 | CA2 |
| Increment/decrement | INC/DEC. |

The other contact lines on the card are:

| Data | D0–D7 |
| Electrical supply for the card | VCC |
| Ground | GND |
| Read command | OE |
| Writing programming | PGM |
| Writing supply | VPP. |

The two last-mentioned lines are provided because the memory card is formed partially of a programmable memory and partly of an electrically programmable and erasable memory. The programmable memory 14 stores data relating to the type of internal configuration (size of up/down counters, size of the memory . . . ) and the method of using the card. The electrically programmable and erasable memory 15 stores the addresses of the last parts of the memory read or written during the last use. The remaining memory 16 serves to store text, images, or programs and can be of the one or the other type.

The connector of the memory card of the invention is limited to 16 contacts even though it can hold memory to 268 megabytes.

A variant can reduce this number of lines to ten by transmitting the eight data bits serially on a single line thanks to a shift register. This method performs less well and requires a clock and a synchronization line.

The invention as described above can be easily put in practice with known technology and can be use to disseminate information or consumer applications such as electronic games or electronic books which are read by an apparatus provided with a liquid-crystal display.

The data in memory in the card can need to be protected and the writers of programming, games, or books distributed in this form can want to limit the number of users of the same work. To achieve this the invention can have two code registers each containing eight bytes that can only be written. One register 17 is definitively configured with an ASCII password chosen by the buyer of the item when he purchases the card or by the first user. The other register 18 is a nonpermanent random-access memory which is configured for each use of the card. A bit-by-bit comparison of the two code registers by a comparator 19 can by means of a simple system of AND or NAND gates give access to the area of memory holding the data to be used thanks to a latch 20 operated by a decoder 21 which decides which memories to lock. Data comes or goes through a buffer 22 itself operated by a reading/programming circuit 23.

Figure 4:
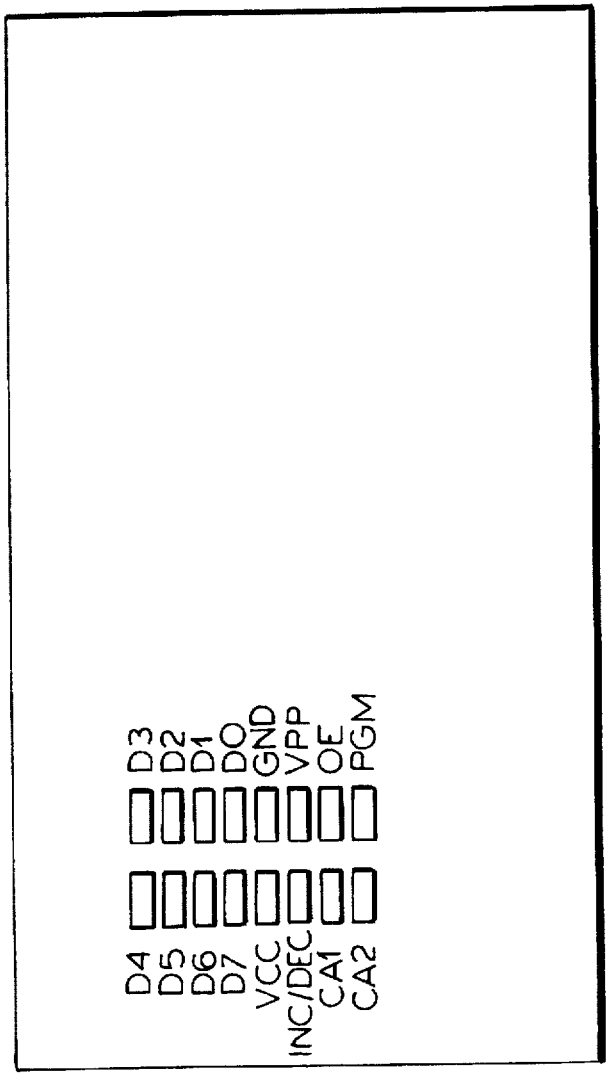
FIG. 4 a top view showing the layout of the external contacts of the card according to the invention.

The architecture of the card having been explained, FIG. 4 shows a possible configuration of the contacts of the card. This configuration correspond to the two positions of contacts described in ISO standard 7816-2 of October 1988 used at the same time.

Other variants of the connectors can be imagined without leaving the scope of the present invention and the application retains the exclusivity of all embodiments covered by the following claims.

I claim:

1. An independent and portable electronic memory card for use in a reading and writing apparatus, said memory card comprising:

a card-shaped support;
   a memory element on said support;
   an 8-to-16 bit first up/down counter on said support connected to said memory element for addressing said memory element by 8 to 16 bits;
   a 10-to-18 bit second up/down counter on said support connected to said first counter by a holding line and connected to said memory element for addressing said memory element by 10 to 18 additional bits; and
   a connector on said support for connecting said memory element and said up/down counters to said apparatus, said connector comprising:
      a first contact for transmitting pulses independently to said 8-to-16 bit first up/down counter to increment or decrement an address of said memory element by 1 at each application of a pulse to said 8-to-16 bit first up/down counter,
      a second contact for transmitting pulses independently to said 10-to-18 bit second up/down counter to increment/decrement said 10-to-18 bit second up/down counter by 1 and increment or decrement said address of said memory element by $2^8$ to $2^{16}$ at each application of a pulse to said 10-to-18 bit second up/down counter,
      a common exclusive third contact connected to both of said counters for transmitting to said counters an electrical signal for determining by a logic level of said electrical signal the incrementing or decrementing of each of said up/down counters,
      a set of eight data contacts (D0 to D7),
      an electrical supply contact (VCC),
      a ground contact (GND),
      a read-order contact (OE),
      a program/writing-order contact (PGM), and
      a writing-supply contact (VPP).

2. The independent and portable memory card according to claim 1 wherein said connector comprises an array of 16 contacts including said first, second, third and further contacts, arranged.

3. The independent and portable memory card according to claim 1 wherein said memory element:
   includes a consultable programmable memory for recording an internal configuration and method of using the card.

4. The independent and portable memory card according to claim 1 wherein said memory element:
   includes an electrically reprogrammable and erasable memory for recording an address of last data read or written as of a last use of the card.

5. The independent and portable memory card according to claim 1 wherein said memory element:
   includes an electrically programmable memory for recording text, images, and programming data.

6. The independent and portable memory card according to claim 1 wherein said memory element:
   includes an electrically reprogrammable and erasable memory for recording text, images, or programming data.

* * * * *